United States Patent
Velez et al.

(10) Patent No.: US 6,188,722 B1
(45) Date of Patent: Feb. 13, 2001

(54) SEQUENTIAL BLIND CONVERGENCE PROCESS IN AN ADAPTIVE DECISION FEEDBACK EQUALIZER

(75) Inventors: Edgar Velez, Kanata; Ian Dublin, Ottawa, both of (CA); Richard Buz, Rohnert Park, CA (US); Sisay Yirga, Nepean (CA)

(73) Assignee: Nortel Networks Limited, Quebec (CA)

( * ) Notice: Under 35 U.S.C. 154(b), the term of this patent shall be extended for 0 days.

(21) Appl. No.: 09/069,521

(22) Filed: Apr. 29, 1998

(51) Int. Cl.$^7$ .............................. H03K 5/159; H03K 5/00
(52) U.S. Cl. .......................................... 375/233; 333/28 R
(58) Field of Search .................................. 375/233, 232, 375/229, 261, 298; 333/28 R; 708/322, 323, 300

(56) References Cited

U.S. PATENT DOCUMENTS

| | | | |
|---|---|---|---|
| 5,119,401 | * 6/1992 | Tsujimoto | 375/233 |
| 5,293,401 | * 3/1994 | Serfaty | 375/231 |
| 5,541,956 | 7/1996 | Ueda | 375/232 |
| 5,642,382 | * 6/1997 | Juan | 375/232 |
| 5,689,528 | 11/1997 | Tsujimoto | 375/233 |
| 5,694,423 | 12/1997 | Larsson et al. | 375/231 |
| 6,069,917 | * 5/2000 | Werner et al. | 375/233 |

\* cited by examiner

*Primary Examiner*—Chi H. Pham
*Assistant Examiner*—Khai Tran
(74) *Attorney, Agent, or Firm*—Pearne & Gordon LLP

(57) ABSTRACT

A blind convergence process for an adaptive decision feedback equalizer having an quadrature amplitude modulation (QAM) slicer, a forward filter defined by a plurality of forward tap coefficients and a feedback filter defined by a plurality of feedback tap coefficients. The blind convergence process includes the step of initializing the forward tap coefficients of the forward filter and the feedback tap coefficients of the feedback filters with predetermined values. The QAM slicer operates in two modes: a clustering mode and a decision directed mode. The clustering mode includes the step of updating only the forward tap coefficients of the forward filter for a prescribed start-up QAM index (such a 4 QAM). The decision directed mode is predefined for set of QAM indexes having values $n_1, n_2, \ldots n_m$, and includes: updating the forward tap coefficients of the forward filter for a QAM index $n_i$ selected from the predefined set of QAM indexes, and updating the feedback tap coefficients of the feedback filter for the QAM index $n_i$ selected from the predefined set of QAM indexes. The decision directed processing steps are repeating the next QAM index $n_{i+1}$ of the predefined set of QAM indexes until the equalizer has converged to its highest available QAM index or until the equalizer has converged to the highest operable QAM index (constellation). The QAM index set can be $\{4,16,64,256\}$.

29 Claims, 5 Drawing Sheets

SEQUENTIAL BLIND CONVERGENCE PROCESS IN AN ADAPTIVE DECISION FEEDBACK EQUALIZER

FIELD OF THE INVENTION

This invention relates to the field of blind convergence processes in an adaptive decision feedback equalizer such as may be used in modems.

BACKGROUND OF THE INVENTION

In communication systems a modem is used to convert (modulate) digital signals generated by a computer into analog signals suitable for transmission over telephone lines. Another modem, located at the receiving end of the transmission, converts (demodulates) the analog signals back into digital form. In a particular modulation transmission scheme, the phase and amplitude of a signal are shifted to various combinations of values, each combination indicating a different set of transmitted bits. At the receiver, proper decoding includes detecting the various phase and amplitude combinations. In a two dimensional modulation scheme, the signal can be represented mathematically with an I (in-phase) component and a Q (quadrature-phase) component of the signal, each of which is $\pi/2$ out of phase with respect to the other. The plot of these two components on a two dimensional graph for a set of received symbols results in a pattern referred to as a constellation.

Proper detection of the I and Q components of the signal is hampered by various sources of signal degradation. One such source is intersymbol interference where consecutive transmitted symbols interfere with each other. Other sources of signal degradation include the transmission media (i.e. wire) and analog filters. These factors produce large amplitude and group delay distortion in the signal that needs compensation.

To compensate for intersymbol interference (ISI) and other sources of signal degradation and distortion, best performance is achieved by implementing an equalizer as a fractionally spaced adaptive filter. An adaptive filter can modify from time instant to time instant, the coefficients, also referred to as tap weights, used in the filter to remove ISI and to compensate for amplitude and group delay distortions. The update of the tap weights is done to minimize the error at the output of the filter. This error is effectively a measure of the difference between the actual output of the filter and the expected output. The adaptive process continues until the error is at a minimum (i.e. the filter converges).

The convergence of an equalizer depends on many factors including initial tap weights, desired convergence rate, signal to noise ratio (SNR) at the input and phase changes caused by a clock recovery circuit at the receiver, and can be accomplished with various adaptive algorithms.

The adaptation of the tap weights in adaptive equalizers is based on an assumed correct decision about which symbol was received. This assumption is valid for equalizers with a training sequence for which the received symbol is in fact known in advance. Equalizers, however, are also used without the benefit of a training sequence, in which case the decision is not necessarily correct. These equalizers are referred to as blind equalizers. The term blind refers to trying to find the correct equalizer coefficients without a reference training sequence, therefore during convergence the decisions may be incorrect and the coefficients (weights) erroneously updated. Although the possibility of a mistake exists, if the blind equalizer makes correct decisions for a sufficiently large set of received symbols, the equalizer will converge correctly.

If many erroneous decisions occur, the algorithm may converge to a local minimum (false convergence) or may not converge at all. Two common types of convergence failures for two dimensional modulation schemes such as Quadrature Amplitude Modulation (QAM), where the information is transmitted by modulating both the amplitude and phase of the carrier signal, are summarized below:

1. Both the I and Q parts of the equalizer converge to tap weight settings such that both parts decode the same symbols, either the I symbols or the Q symbols. When the I and Q equalizers converge to similar tap weight settings, the resulting constellation appears as a diagonal line.

2. The I and Q parts converge to tap weight settings such that the I equalizer decodes a symbol transmitted at time t while the Q equalizer decodes a symbol transmitted at time t-1. This failure is difficult to detect since the I and Q parts of the equalizer are passing their respective correct I and Q components, albeit not from the same time instant (i.e. instead of having a $\pi/2$ difference, the I and Q components have a $5\pi/2$ difference).

Prior art solutions for dealing with the convergence failures discussed above continue to present potential problems in their use since filter convergence is not guaranteed in theory, depending on the distortion and noise. Further, convergence without the need of training sequences based on random QAM input is very difficult for higher than 4 QAM since there is no reference signal available.

SUMMARY OF THE INVENTION

An object of the present invention is to provide a blind convergence process for an adaptive decision feedback equalizer to limit convergence failure.

In accordance with an aspect of the present invention there is provided a blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of: (a) performing a clustering process comprising: (a1) updating the forward tap coefficients of the forward filter; (b) performing a decision directed process for a predefined set of QAM indexes having values $n_1, n_2, \ldots, n_m$, comprising: (b1) updating the forward tap coefficients of the forward filter for a QAM index $n_i$ selected from the predefined set of QAM indexes, and (b2) updating the feedback tap coefficients of the feedback filter for the QAM index $n_i$ selected from the predefined set of QAM indexes; (c) determining if the equalizer has converged, and (d) repeating steps (b1), (b2) and (c) for a next QAM index $n_{i+1}$ of the predefined set of QAM indexes until the equalizer has converged to the highest operable QAM index.

In accordance with another aspect of the present invention there is provided a blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of: (a) initializing the forward tap coefficients of the forward filter and the feedback tap coefficients of the feedback filters with predetermined values; (b) updating the forward tap coefficients of the forward filter with a 4 QAM signal; (c) performing a decision directed process for a predefined set of QAM indexes having values $n_1, n_2, \ldots, n_m$, comprising: (c1) updating the forward tap coefficients of the forward filter for a QAM index $n_i$ selected from the predefined set of QAM indexes, and (c2) updating the feedback tap coefficients of the feedback filter for the QAM index $n_i$ selected from the predefined set of QAM indexes; (d) determining if the equalizer has converged, and (e) repeating steps (c1), (c2) and (d) for a next QAM index $n_{i+1}$ of the predefined set of QAM indexes until the equalizer has converged to its highest available QAM index.

BRIEF DESCRIPTION OF THE DRAWINGS

The present invention will be described in conjunction with the drawings in which.

DETAILED DESCRIPTION OF EMBODIMENTS OF THE INVENTION

Figure 1:
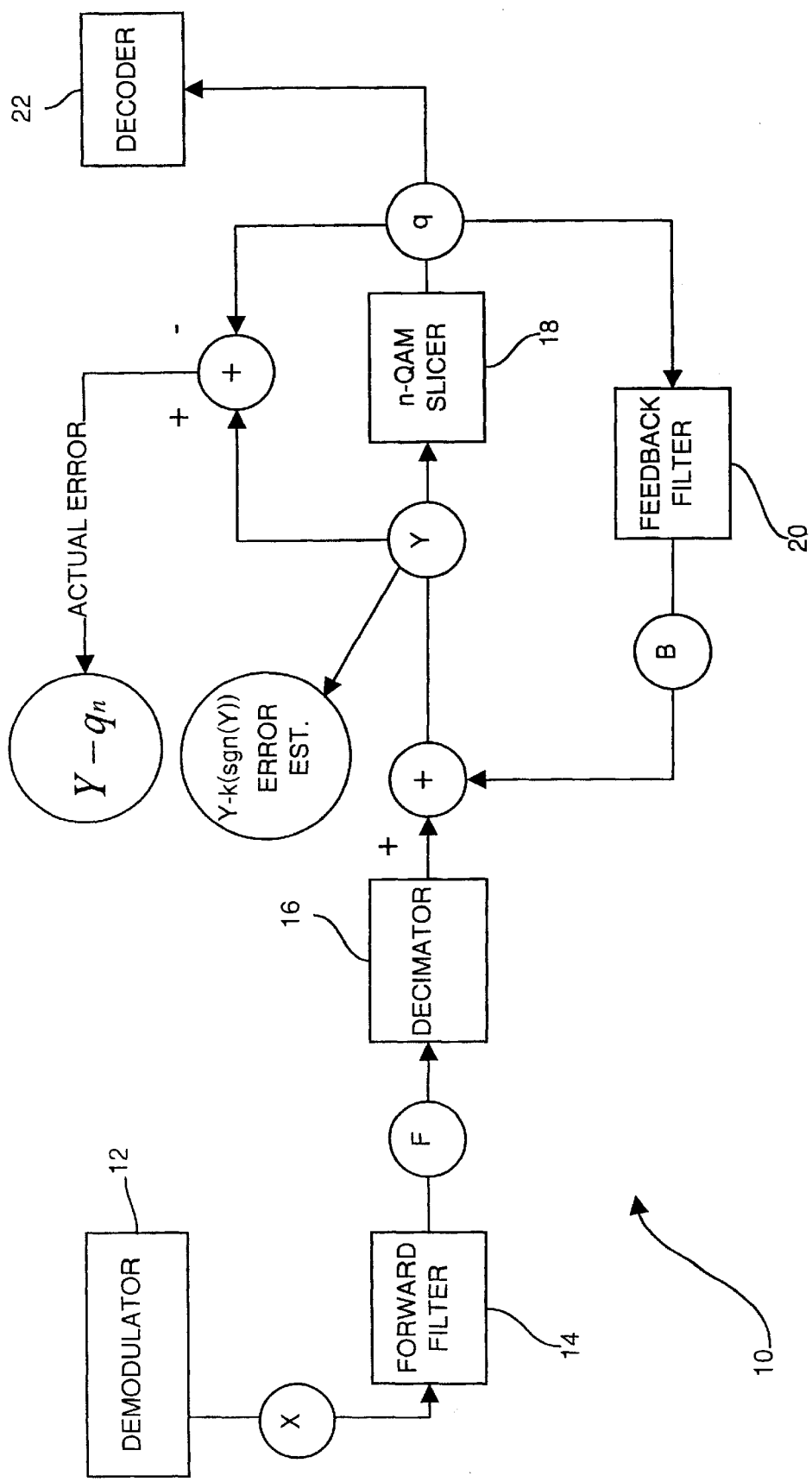
FIG. 1 illustrates a block diagram of an adaptive decision feedback equalizer.
Figure 2:
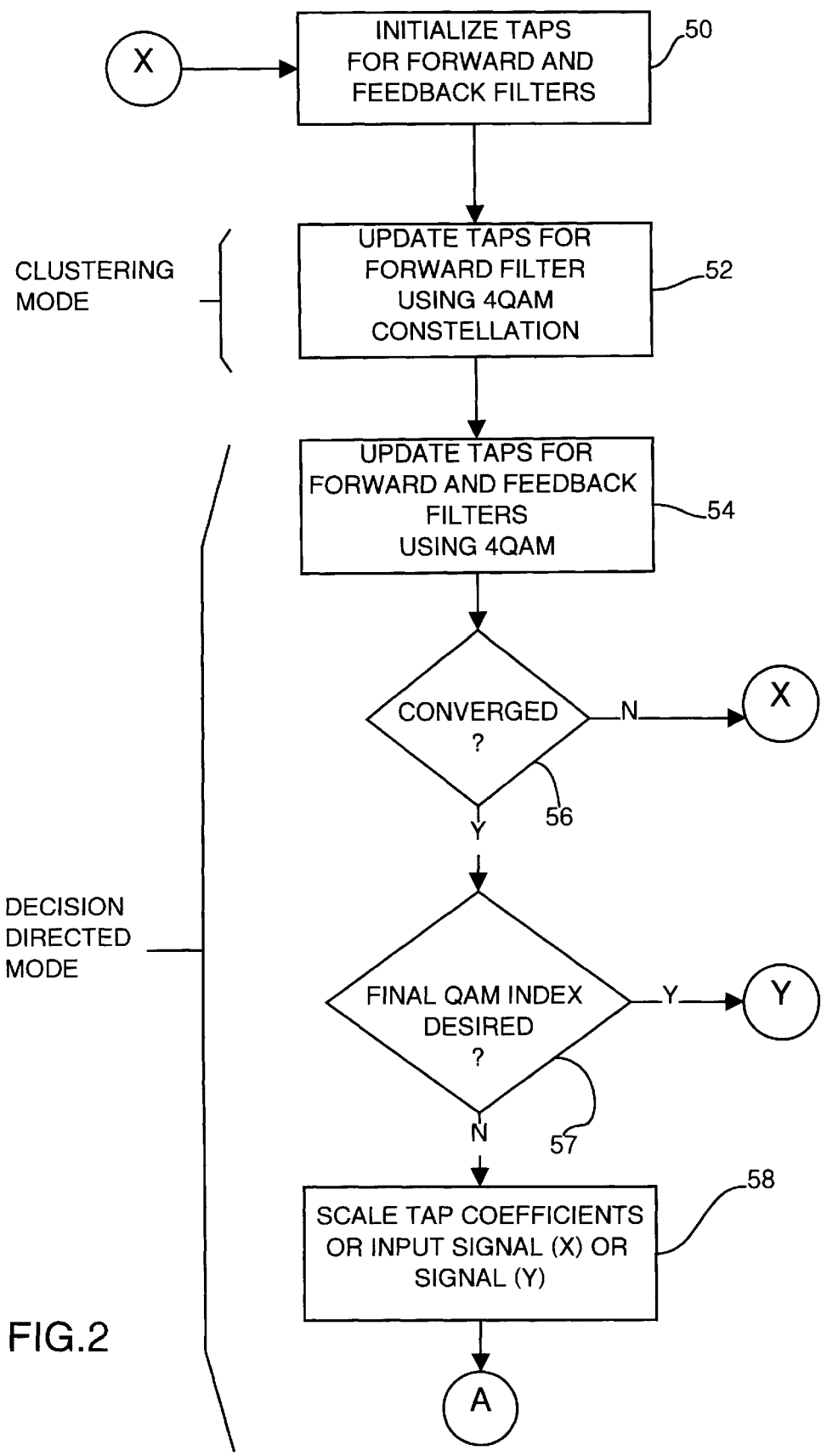
FIGS. 2, 3, 4 and 5 illustrate flow charts showing the blind convergence process of the equalizer of FIG. 1 according to the present invention.
Figure 3:
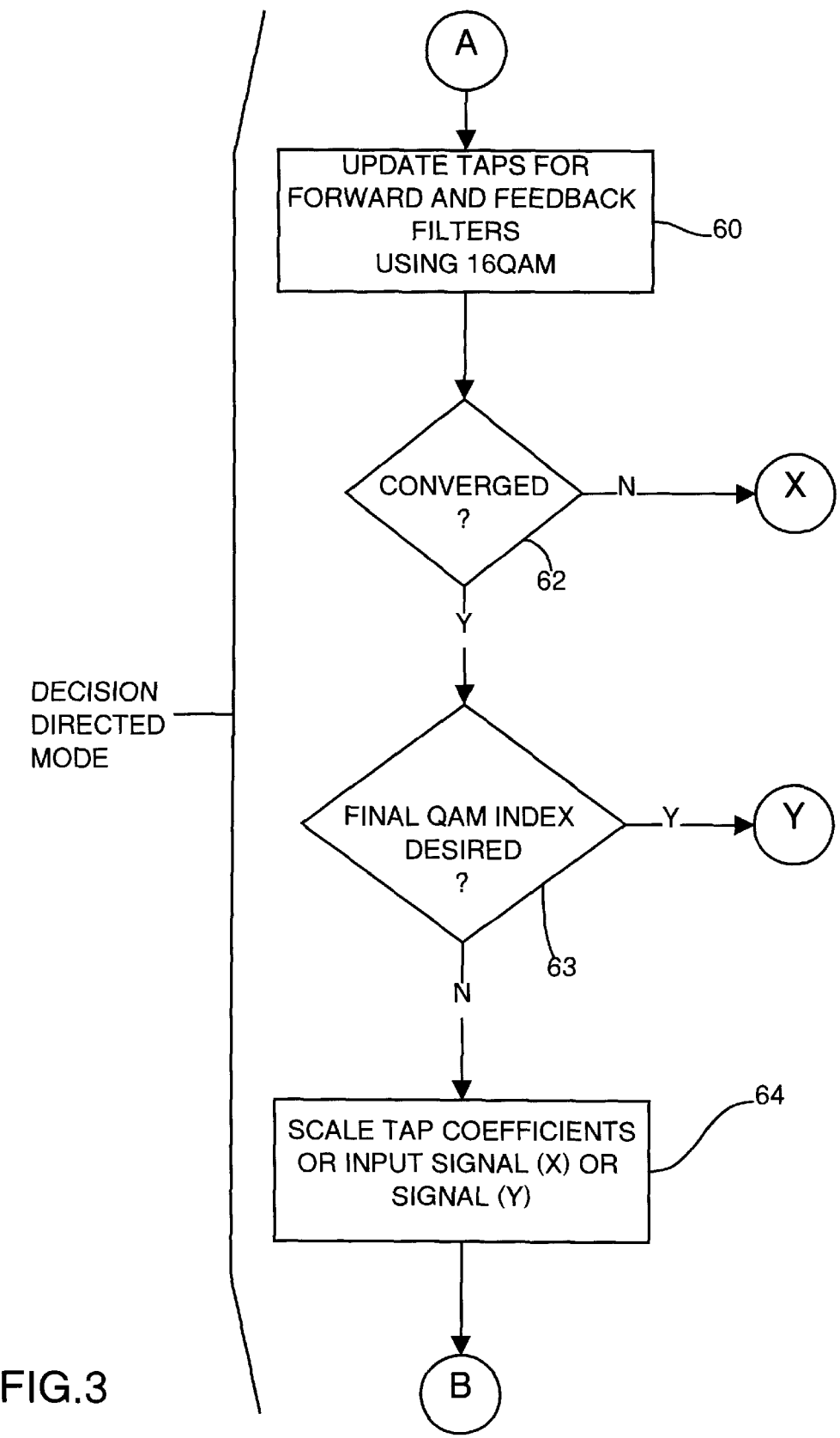
Figure 4:
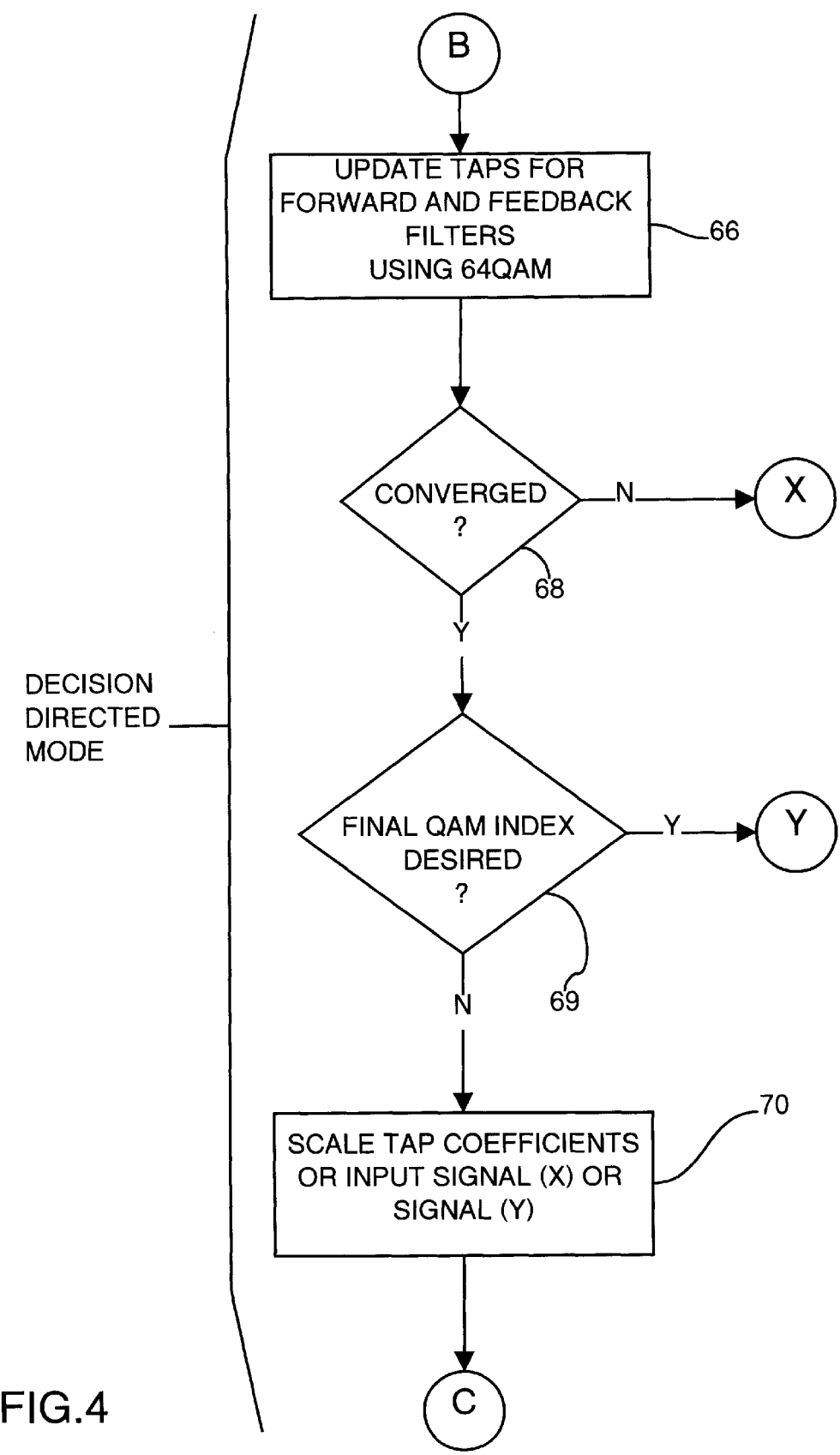
Figure 5:
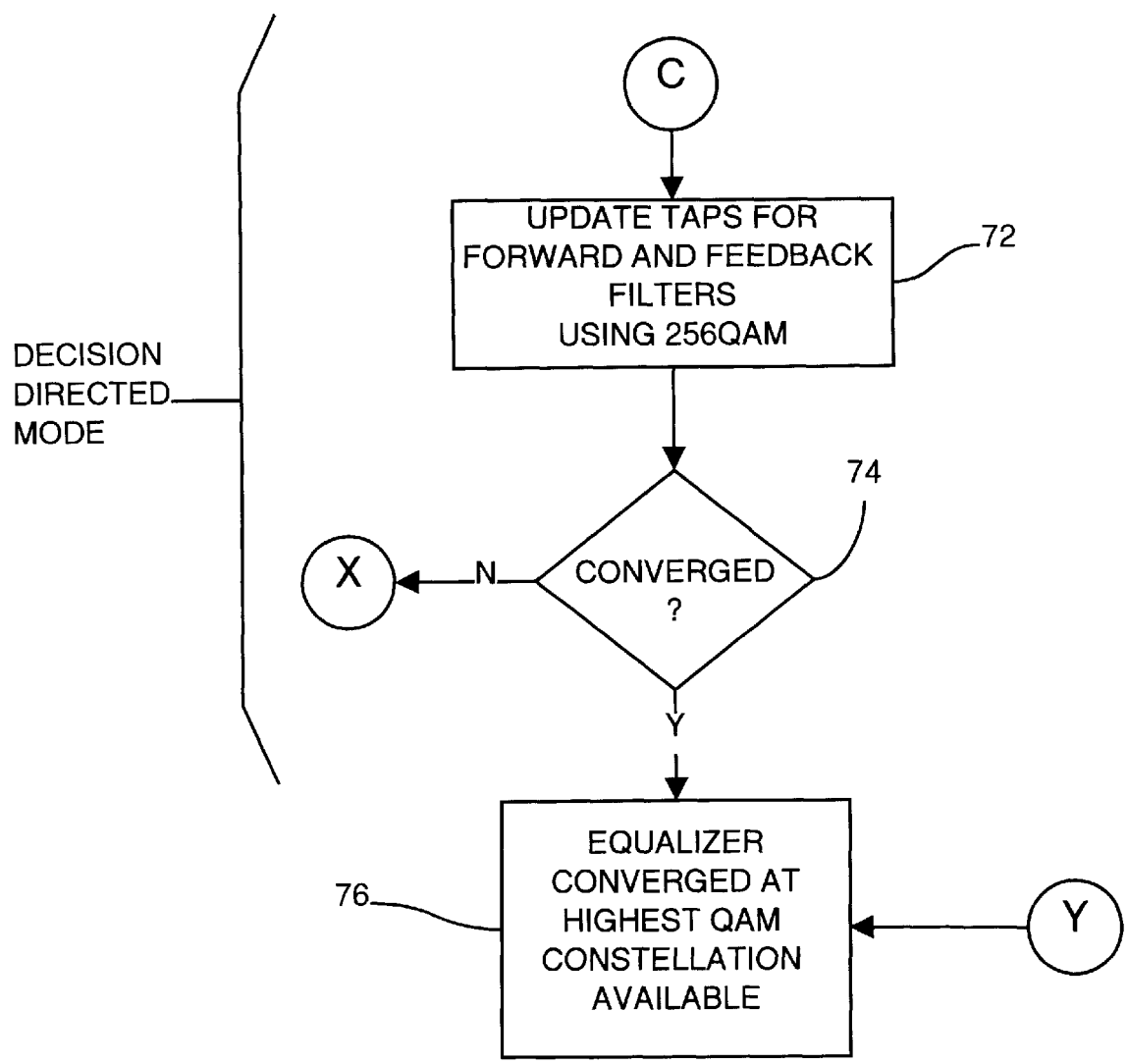

An equalizer 10, shown in FIG. 1, is used to counteract effects of amplitude and phase distortion introduced by a channel and analog front end of a receiver in a modem. The input X=I+jQ to the equalizer 10 is a complex input taken from the output of Nyquist filters located in a demodulator 12, which is first downsampled by a factor of 2 to provide in-phase (I) and quadrature (Q) datastream signals at twice the symbol rate (i.e. symbol rate=inverse of the baud rate of the modem).

The input X is passed through a complex-valued forward filter 14 to produce an output F. The output F of the forward filter 12 is downsampled by decimator 16 by a factor of 2, resulting in a symbol rate data sequence. Quantized output q from an n-QAM slicer 18 is used as input to a complex-valued feedback filter 20 to produce an output B. The output B of the feedback filter 28 is subtracted from the down-sampled output (decimated) of the forward filter 14 resulting in an equalized signal Y.

The equalized signal Y is then passed through the n-QAM slicer 18, that quantizes each data sample (for each signal component I and Q of X) to a discrete symbol level in a constellation. The constellation represents a plot of the in-phase (I) component and the quadrature (Q) component of the input signal X on a two dimensional graph for a set of received symbols. An actual error signal $e_a$ is defined as the difference between the equalized signal Y and the quantized output q from the slicer 18. The actual error $e_a$ will be used in a decision directed mode during convergence (discussed in detail below) to update tap coefficients of the forward filter 14 and the feedback filter 20 once per symbol duration. An error estimate is also calculated based on the equalized signal Y as discussed in detail below. The quantized output q of the slicer 18 is also sent to a symbol decoder 22 to recover raw data.

The operation of the forward filter 14 is described by the equation:

$$F(t) = \sum_{i=1}^{M} C_{fi} X(t-i)$$

where F(t) represents the complex-valued output of the filter 14 at time t, X(t) is the complex-valued input to the filter 14 at time t, and $C_{fi}$ are the complex-valued filter coefficients (also termed the tap coefficients) for the filter 14. The complex-valued data F(t) is composed of an in-phase (I) component and an quadrature (Q) component.

The operation of the feedback filter 20 is described by the equation:

$$B(t) = \sum_{i=1}^{N} C_{bi} q(t-1-i)$$

where B(t) represents the output of the filter 20 at time t, $C_{bi}$ are the complex-valued feedback filter coefficients for the filter 20, and q(t) is the quantized output of the slicer 18 at time t.

The slicer 18 accepts the signal Y (representing the I and Q components of the equalized signal) and makes a decision as to which QAM symbol is actually received. In order to quantize the signal to the appropriate level in a constellation, the slicer 18 has a pair of control bits which specify the level of QAM constellation being used. An example of the correspondence between control bits and QAM constellation is illustrated in Table A1.

TABLE A1

| QAM CONSTEL-LATION TYPE | QAM MODE CONTROL PINS | QUANTIZED SYMBOL CO-ORDINATE LEVELS | SATO CONSTANT (k) |
|---|---|---|---|
| 4 QAM | 00 | ±½ | ½ |
| 16 QAM | 01 | ±¼, ±¾ | ⅝ |
| 64 QAM | 10 | ±⅛, ±⅜, ±⅝, ±⅞ | 21/32 |
| 256 QAM | 11 | ±1/16, ±3/16, ... | 85/128 |

The method of blind convergence according to the present invention will be described with reference to the flow charts of FIGS. 2 to 5. For discussion purposes, the filters 14 and 20 are configured with specific parameters as defined below. It is readily understood by those skilled in the art that the number of taps per filter and the bit representation per tap are design choices.

The real (I) and imaginary (Q) parts of the tap coefficients of the forward filter 14 are stored as 24 bit quantities, but are rounded to 16 bits before being used in the filtering operation. A total of 48 forward filter taps are used. The in-phase and quadrature output samples F(t) of the filter 14 are truncated to have a precision of 21 bits. The forward filter 14 of the equalizer 10 is fractionally spaced, and operates at twice the symbol rate.

The complex-valued quantized output q is composed of the I and Q components, each of which has a precision of 5 bits. The real (I) and imaginary (Q) parts of the tap coefficients of the feedback filter 20 are each stored as 24 bit quantities, but are rounded to 16 bits before being used for filtering. The output B(t) (I and Q components) of the filter 20 has a precision of 21 bits. Data is passed through the filter 20 at the symbol rate, and a total of 48 complex feedback filter taps are used.

Initialization

Two options exist for initializing the tap coefficients of the filters 14 and 20 of the equalizer 10 at step 50. The first option is to assign arbitrary tap coefficients to the filters 14 and 20. A second option is to assign specific tap coefficients to the filters 14 and 20 in an effort to improve the convergence processing.

One example of assigning specific tap coefficients consists of all tap coefficients of the feedback filter 20 and all but one of the tap coefficients of the forward filter 14 being set to zero. The remaining non-zero coefficient of the forward filter 14 has both the real and imaginary parts set to a value of 1 (i.e. 1+j1). The position of the non-zero tap coefficient of the forward filter 14 is a programmable design choice.

Typically, the last forward tap coefficient in the filter 14 would be initialized with 1+j1. However, to deal with amplitude modulation (AM) or other narrowband {radio frequency (RF)} interference it is desirable to initialize a forward tap coefficient with 1+1j before the last tap in the filter 14 (for example at tap coefficient number 20 of the 48 possible forward filter taps).

The slicer 18 operates in two distinct modes: (1) clustering mode and (2) decision-directed mode. In general, decision-directed mode is used to adapt the tap coefficients of filters 14 and 20 based on a standard least-mean-square (LMS) algorithm. In order to ensure the convergence of the tap coefficients of the filters 14 and 20, the slicer 18 must make a sufficient number of correct decisions. However, the equalizer 10 may not converge in decision-directed mode at start-up if the channel is too distorted, as this would result in most initial quantizations being incorrect.

In order to get the equalizer 10 into a state where decision-directed mode operation will function properly, the slicer 18 is initially placed in the clustering mode. In the clustering mode tap coefficients of the filter 14 are updated using an estimated error $e_e$. In one embodiment, the estimated error $e_e$ is based on the Sato algorithm, which is known in the art. The estimated error $e_e$ based on Sato is defined as:

$$e_e = Y - k(sgn(Y)) = Y - (\pm k \pm jk) = Y - k(\pm 1 \pm j1)$$

where k is the Sato constant and Y is the slicer input at time t.

The estimated error $e_e$ is not based on the quantized output q of the slicer 18. Also, the Sato constant k is dependent on the type of QAM constellation selected during the clustering mode and is defined in Table A1 above for a sample of signal sets.

For simplicity in processing, a 4 point constellation (4QAM) is selected during the clustering mode (i.e. Sato error level constant (k=½)). The clustering mode prepares the tap coefficients of the filter 14 to improve the probability of convergence of the equalizer 10.

Clustering Mode

The tap coefficients of the forward filter 14 are updated at step 52 once for every pair of input data samples X. The taps of the forward filter 14 are updated using the following equation:

$$C_{fi} = C_{fi-1} + (\mu_f)(e_e)(X)$$

where $C_{fi}$ represent the tap coefficients of the forward filter 14

$\mu_f$ represents an adaptation rate variable used to update the tap coefficients of the forward filter 14

$e_e$ represents the estimated error and is defined for a 4 QAM constellation using the Sato constant as:

$$e_e = Y - (\pm\tfrac{1}{2} \pm j\tfrac{1}{2})$$

X represents the complex input signal (I+jQ)

Decision Directed Mode

The decision directed mode of the process of the present invention updates the tap coefficients for both filters (14 and 20) in predetermined QAM index (n) increments until the equalizer 10 has converged to its highest operable QAM index. In the present example, the QAM index increments are 4QAM (n=4), 16QAM (n=16), 64QAM (n=64), and 256QAM (n=256). The choice of index values (n) and the number of increments is a design choice and can be varied to suit a particular operating environment.

For example, if the equalizer 10 is to converge to a 256QAM signal the following general process is followed: (1) start sending 4QAM; (2) if filters 14 and 20 converge retain tap coefficients and proceed to step 3; (3) start sending 16QAM; (3) if filters 14 and 20 converge retain tap coefficients and proceed to step 4; (4) start sending 64QAM; (4) if filters 14 and 20 converge retain tap coefficients and proceed to step 5; (5) start sending 256QAM; (6) if filters 14 and 20 converge then the equalizer 10 has converged to the highest operable QAM index (i.e. 256). A more detailed description of the decision directed mode component of the method of blind equalization according to the present invention is provided hereinbelow.

At step 54, the tap coefficients of the forward and feedback filters are updated using the actual error $e_a$ for a 4QAM constellation based on the output Y and the quantized output $q_n$ from the n-QAM slicer 18, where n=4. In particular, in decision-directed mode, updates of the tap coefficients of the forward and feedback filters are performed using the following equations:

Tap updates for forward filter 14

$$C_{fi} = C_{fi-1} + (\mu_f)(e_a)(X) \qquad \text{EQ. Tap 1}$$

where $C_{fi}$ represent the tap coefficients of the forward filter 14

$\mu_f$ represents an adaptation rate variable used to update the tap coefficients of the forward filter 14

$e_a$ represents the actual error for a given QAM index (n) and is defined as $e_a = Y - q_n$ X represents the complex input signal (I+jQ)

Tap updates for feedback filter 20

$$C_{bi} = C_{bi-1} + (\mu_b)(e_a)(X) \qquad \text{EQ. Tap 2}$$

where $C_{bi}$ represent the tap coefficients of the feedback filter 20

$\mu_b$ represents an adaptation rate variable used to update the tap coefficients of the feedback filter 20

$e_a$ represents the actual error for a given QAM index (n) and is defined as $e_a = Y - q_n$ X represents the complex input signal (I+jQ)

A convergence check is performed at step 56, if the tap coefficients of filters 14 and 20 have not converged then processing is returned to the initialization step 50. If the tap coefficients of filters 14 and 20 have converged then it is determined if 4QAM is the final QAM index desired at step 57. An alternative way to consider decision block 57 is to determine if the signal-to-noise ratio is too low for the next QAM index (i.e. 16 QAM). If the decision at step 57 is yes, then processing is completed at step 76 and the equalizer 10 is converged for 4QAM-the highest QAM index available or the highest operable QAM index of the equalizer 10.

If the decision at step 57 is no, then the tap coefficients ($C_{fi}$ and $C_{bi}$) for the filters 14 and 20, respectively, are retained and scaled at step 58. Then, at step 60, a 16QAM signal is authorized to be sent and received and the tap coefficients ($C_{fi}$ and $C_{bi}$) are updated for 16QAM. In particular, at step 60, the tap coefficients are updated using equation Tap 1 for $C_{fi}$ and using equation Tap 2 for $C_{bi}$ with $e_a=Y-q_{16}$.

The scaling step 58 is performed to improve the adaptation of the tap coefficients of the filters 14 and 20 to the next level QAM update. Scaling can include: (a) scaling the equalized signal Y, which scales the coefficients ($C_{fi}, C_{bi}$) through the error variable $e_a$, (b) the equalized signal Y can be directly scaled by a scaling value prior to being used in the error equation $e_a=Y-q_n$; or (b) the input signal X can be scaled.

A convergence check is performed at step 62 (FIG. 3), if the tap coefficients of filters 14 and 20 have not converged then processing is returned to the initialization step 50. If the tap coefficients of filters 14 and 20 have converged then it is determined if 16QAM is the final QAM index desired at step 63. An alternative way to consider decision block 63 is to determine if the signal-to-noise ratio is too low for the next QAM index (i.e. 64 QAM).

If the decision at step 63 is yes, then processing is completed at step 76 and the equalizer 10 is converged for 16QAM-the highest QAM index available or the highest operable QAM index of the equalizer 10.

If the decision at step 63 is no, then the tap coefficients ($C_{fi}$ and $C_{bi}$) for the filters 14 and 20, respectively, are retained and scaled at step 64. Then, at step 66, a 64QAM signal is authorized to be sent and received and the tap coefficients ($C_{fi}$ and $C_{bi}$) are updated for 64QAM. In particular, at step 66, the tap coefficients are updated using equation Tap 1 for $C_{fi}$ and using equation Tap 2 for $C_{bi}$ with $e_a=Y-q_{64}$. The scaling step 64 is identical to scaling step 58 discussed above.

A convergence check is performed at step 68 (FIG. 4), if the tap coefficients of filters 14 and 20 have not converged then processing is returned to the initialization step 50. If the tap coefficients of filters 14 and 20 have converged then it is determined if 64QAM is the final QAM index desired at step 69. An alternative way to consider decision block 69 is to determine if the signal-to-noise ratio is too low for the next QAM index (i.e. 256 QAM).

If the decision at step 69 is yes, then processing is completed at step 76 and the equalizer 10 is converged for 64QAM-the highest QAM index available or the highest operable QAM index of the equalizer 10.

If the decision at step 69 is no, then the tap coefficients ($C_{fi}$ and $C_{bi}$) for the filters 14 and 20, respectively, are retained and scaled at step 70. Then, at step 72, a 256QAM signal is authorized to be sent and received and the tap coefficients ($C_{fi}$ and $C_{bi}$) are updated for 256QAM. In particular, at step 72, the tap coefficients are updated using equation Tap 1 for $C_{fi}$ and using equation Tap 2 for $C_{bi}$ with $e_a=Y-q_{256}$. The scaling step 70 is identical to scaling step 58 discussed above.

A convergence check is performed at step 74 (FIG. 5), if the tap coefficients of filters have converged then processing is completed (step 76) and the equalizer is converged for 256QAM-the highest QAM index available or the highest operable QAM index of the equalizer 10. If the tap coefficients of filters 14 and 20 have not converged then the equalizer has not converged and processing returns to the initialization step 50.

What is claimed is:

1. A blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of:

(a) performing a clustering process comprising:
  (a1) updating the forward tap coefficients of the forward filter;
(b) performing a decision directed process for a predefined set of QAM indexes having values $n_1, n_2, \ldots, n_m$, comprising:
  (b1) updating the forward tap coefficients of the forward filter for a QAM index $n_i$ selected from the predefined set of QAM indexes, and
  (b2) updating the feedback tap coefficients of the feedback filter for the QAM index $n_i$ selected from the predefined set of QAM indexes;
(c) determining if the equalizer has converged, and
(d) repeating steps (b1), (b2) and (c) for a next QAM index $n_{i+1}$ of the predefined set of QAM indexes until the equalizer has converged to the highest operable QAM index.

2. The process of claim 1, wherein the step (a1) of the clustering process is performed using an estimated error.

3. The process of claim 2, wherein the estimated error is defined as:

$$e_e=Y-k(sgn(Y))=Y-(\pm k \pm jk)=Y-k(\pm 1 \pm j1),$$

where $e_e$ is the estimated error, Y is an equalized signal from the forward filter and k is a prescribed error level variable.

4. The process of claim 1, wherein $n_1<n_2<n_3, \ldots, n_{m-1}<n_m$.

5. The process of claim 3, wherein k is set to a value of ½ when the QAM index $n_i=4$.

6. The process of claim 3, wherein k is set to a value of ⅝ when the QAM index $n_i=16$.

7. The process of claim 3, wherein k is set to a value of $21/32$ when the QAM index $n_i=64$.

8. The process of claim 3, wherein k is set to a value of $85/128$ when the QAM index $n_i=256$.

9. The process of claim 3, wherein the step of updating the forward tap coefficients of the forward filter during the clustering process is defined by:

$$C_{fi}=C_{fi-1}+(\mu_f)(e_e)(X)$$

where $C_{fi}$ represent the forward tap coefficients of the forward filter; $\mu_f$ represents an adaptation rate variable for the forward filter; and X represents an input signal to the forward filter.

10. The process of claim 1, wherein steps (b1) and (b2) of the decision directed process are performed using an actual error based on the QAM index $n_i$.

11. The process of claim 10, wherein the actual error is defined as:

$$e_a=Y-q_n$$

where $e_a$ is the actual error, Y is an equalized signal from the forward filter and input to the QAM slicer of the equalizer and $q_n$ is the quantized output from the QAM slicer for the QAM index $n_i$.

12. The process of claim 11, wherein the step of updating the forward tap coefficients of the forward filter during the decision directed process is defined by:

$$C_{fi}=C_{fi-1}+(\mu_f)(e_a)(X)$$

where $C_{fi}$ represent the forward tap coefficients of the forward filter; $\mu_f$ represents an adaptation rate variable for the forward filter; and X represents an input signal to the forward filter.

13. The process of claim 12, wherein the step of updating the feedback tap coefficients of the feedback filter during the decision directed process is defined by:

$$C_{bi}=C_{bi-1}+(\mu_b)(e_a)(X)$$

where $C_{bi}$ represent the feedback tap coefficients of the feedback filter and $\mu_b$ represents an adaptation rate variable for the feedback filter.

14. The process of claim 1, further comprising the step of, prior to repeating steps (b1) and (b2), scaling the tap coefficients for the forward and feedback filters based on the next QAM index $n_{i+1}$.

15. The process of claim 14, where the predefined set of QAM indexes are defined as $\{n_1=4, n_2=16, n_3=64, n_4=256\}$.

16. A blind convergence process for an adaptive decision feedback equalizer having a quadrature amplitude modulation (QAM) slicer, a forward filter defined by a plurality of forward tap coefficients and a feedback filter defined by a plurality of feedback tap coefficients, said blind convergence process comprising the steps of:
  (a) initializing the forward tap coefficients of the forward filter and the feedback tap coefficients of the feedback filters with predetermined values;
  (b) updating the forward tap coefficients of the forward filter with a 4 QAM signal;
  (c) performing a decision directed process for a predefined set of QAM indexes having values $n_1, n_2, \ldots, n_m$, comprising:
    (c1) updating the forward tap coefficients of the forward filter for a QAM index $n_i$ selected from the predefined set of QAM indexes, and
    (c2) updating the feedback tap coefficients of the feedback filter for the QAM index $n_i$ selected from the predefined set of QAM indexes;
  (d) determining if the equalizer has converged, and
  (e) repeating steps (c1), (c2) and (d) for a next QAM index $n_{i+1}$ of the predefined set of QAM indexes until the equalizer has converged to its highest available QAM index.

17. The process of claim 16, wherein step (a) includes: setting the feedback tap coefficients to zero and setting all but a selected one of the forward tap coefficients to zero.

18. The process of claim 17, wherein the selected one of the forward tap coefficients is a last tap coefficient of the forward tap coefficients and is set to a value of 1.

19. The process of claim 17, wherein the selected one of the forward tap coefficients is an upper-half tap coefficient of the forward tap coefficients and is set to a value of 1.

20. The process of claim 16, wherein step (b) is performed using an estimated error.

21. The process of claim 20, wherein the estimated error is defined as:

$$e_e=Y-k(sgn(Y))=Y-(\pm k \pm jk)=Y-k(\pm 1 \pm j1),$$

where $e_e$ is the estimated error, Y is an equalized signal from the forward filter and k is a prescribed error level variable.

22. The process of claim 21, wherein the step of updating the forward tap coefficients of the forward filter during the clustering process is defined by:

$$C_{fi}=C_{fi-1}+(\mu_f)(e_e)(X)$$

where $C_{fi}$ represent the forward tap coefficients of the forward filter; $\mu_f$ represents an adaptation rate variable for the forward filter; and X represents an input signal to the forward filter.

23. The process of claim 16, wherein the steps (c1) and (c2) of the decision directed process are performed using an actual error based on the QAM index $n_i$.

24. The process of claim 23, wherein the actual error is defined as:

$$e_a=Y-q_n$$

where $e_a$ is the actual error, Y is an equalized signal from the forward filter and input to the QAM slicer of the equalizer and $q_n$ is the quantized output from the QAM slicer for the QAM index n.

25. The process of claim 24, wherein the step of updating the forward tap coefficients of the forward filter during the decision directed process is defined by:

$$C_{fi}=C_{fi-1}+(\mu_f)(e_a)(X)$$

where $C_{fi}$ represent the forward tap coefficients of the forward filter; $\mu_f$ represents an adaptation rate variable for the forward filter; and X represents an input signal to the forward filter.

26. The process of claim 25, wherein the step of updating the feedback tap coefficients of the feedback filter during the decision directed process is defined by:

$$C_{bi}=C_{bi-1}+(\mu_b)(e_a)(X)$$

where $C_{bi}$ represent the feedback tap coefficients of the feedback filter; and $\mu_b$ represents an adaptation rate variable for the feedback filter.

27. The process of claim 16, further comprising the step of, prior to repeating steps (c1) and (c2), scaling the tap coefficients of the forward and feedback coefficients based on the next QAM index $n_{i+1}$.

28. The process of claim 27, wherein $n_1<n_2<n_3, \ldots, n_{m-1}<n_m$.

29. The process of claim 28, where the predefined set of QAM indexes are defined as $\{n_1=4, n_2=16, n_3=64, n_4=256\}$.

* * * * *